United States Patent [19]

Susman et al.

[11] Patent Number: 4,465,744

[45] Date of Patent: Aug. 14, 1984

[54] SUPER IONIC CONDUCTIVE GLASS

[75] Inventors: Sherman Susman, Park Forest, Ill.; Kenneth J. Volin, Fort Collins, Colo.

[73] Assignee: The United States of America as represented by the United States Department of Energy, Washington, D.C.

[21] Appl. No.: 445,597

[22] Filed: Nov. 30, 1982

[51] Int. Cl.[3] .............................................. H01M 6/18

[52] U.S. Cl. .................................... 429/191; 429/104; 501/55; 501/63; 501/68; 501/72; 501/73

[58] Field of Search ........................ 501/55, 63, 68, 72, 501/73; 429/191, 252, 103, 104

[56] References Cited

U.S. PATENT DOCUMENTS

| | | | |
|---|---|---|---|
| 3,476,602 | 11/1969 | Brown et al. | 136/6 |
| 3,485,702 | 12/1969 | Mochel | 501/55 |
| 3,663,294 | 5/1972 | Levine et al. | 136/6 |
| 3,765,944 | 10/1973 | Taplin et al. | 136/83 R |
| 3,829,331 | 8/1974 | Tsang | 136/146 |
| 4,124,739 | 11/1978 | Sudworth | 429/61 |
| 4,237,196 | 12/1980 | Gutmann et al. | 429/50 |
| 4,237,200 | 12/1980 | Weddigen | 429/191 |
| 4,388,381 | 6/1983 | Mennicke et al. | 429/191 |
| 4,394,280 | 7/1983 | von Alpen et al. | 429/191 |

OTHER PUBLICATIONS

ANL 76-8, Weiner, "The Sodium/Sulfur Battery: A Progress Report", pp. B-219-B-225, 1976.

DOE/ET/25103-TL, Final Report, Contract No. DE-AC02-76ET-25103, pp. 3-10, 32-49 and 102-106.

Souquet, "Electrochemical Properties of Ionically Conductive Glasses", 1980.

*Primary Examiner*—Donald I. Walton
*Assistant Examiner*—Gerard P. Rooney, Jr.
*Attorney, Agent, or Firm*—Robert J. Fisher; Hugh W. Glenn; Michael F. Esposito

[57] ABSTRACT

An ionically conducting glass for use as a solid electrolyte in a power or secondary cell containing an alkali metal-containing anode and a cathode separated by an alkali metal ion conducting glass having an ionic transference number of unity and the general formula: $A_{1+x}D_{2-x/3}Si_xP_{3-x}O_{12-2x/3}$, wherein A is a network modifier for the glass and is an alkali metal of the anode, D is an intermediate for the glass and is selected from the class consisting of Zr, Ti, Ge, Al, Sb, Be, and Zn and X is in the range of from 2.25 to 3.0. Of the alkali metals, Na and Li are preferred and of the intermediate, Zr, Ti and Ge are preferred.

19 Claims, 2 Drawing Figures

SUPER IONIC CONDUCTIVE GLASS

CONTRACTUAL ORIGIN OF THE INVENTION

The United States Government has rights in this invention pursuant to Contract No W-31-109-ENG-38 between the U.S. Department of Energy and Argonne National Laboratory.

BACKGROUND OF THE INVENTION

The present invention relates to a new glass composition characterized by fast ionic transport contemplated for use as a solid electrolyte in various cells. The invention is contemplated for use in power cells, secondary cells and the like.

Unitl recently good ionic conductors were selected almost exclusively from crystalline solid electrolytes. For example, sodium-sulfur electrochemical cells often employ beta alumina as an electrolyte for sodium ion transport. In 1976, a class of crystalline materials was discovered having a sodium conduction comparable to the beta aluminas. These materials were called NASICONS, an acronym for sodium superionic conductors and had a reported stoichiometry of $Na_{1+x}Zr_2Si_xP_{3-x}O_{12}$. Where x is likely to be 2, the "ideal" NASICON material would be $Na_3Zr_2Si_2PO_{12}$. When the inventors attempted to make this "ideal" NASICON material using normal techniques for producing crystalline three dimensional compounds, the material could not be made. Also, during 1979 several other groups reported unsuccessful attempts to make the above set forth NASICON material even using exotic techniques.

Continued work by the inventors with the "ideal" NASICON formula indicated an over abundance of zirconium oxide and with this in mind a new formula was discovered:

$$Na_{1+x}Zr_{2-x/3}Si_xP_{3-x}O_{12-2x/3}.$$

Nevertheless, even at this time the NASICON materials were still thought to be three dimensional crystalline compounds. The basis of this invention was the discovery that the above set forth formula, could be rewritten as a traditional glass formula, and for X=3 is as follows:

$(Na_2O)_2(ZrO_2)(SiO_2)_3$ wherein the sodium oxide acted as a network modifier, the zirconium oxide acted as intermediate and the silicon dioxide acted as the network former. Even after the recognition that the NASICON crystalline formula could be rewritten as a glass, it was yet to be determined whether the stoichiometry could be prepared in the form of a glass and whether the glass, if formed, would demonstrate super ionic conduction and whether the glass formulation could prove resistant to the corrosive effects of molten sodium, molten sulfur and the other materials found in typical batteries at the operating temperatures thereof.

SUMMARY OF THE INVENTION

In view of the foregoing, it is an object of the present invention to provide an ionically conductive glass.

It is a further object to provide an ionically conductive glass useful in a battery having an anode containing an alkali metal.

It is yet a further object of the invention to provide a battery utilizing a glass of the type set forth.

In more specific aspects, there is provided an ionically conductive glass having the general formula:

$A_{1+x}D_{2-x/3}Si_xP_{3-x}O_{12-2x/3}$, wherein A is an alkali metal, D is selected from the class consisting of Zr, Ti, Al, Sb, Be, Zn, and Ge and X is in the range of from 2.25 to 3.0.

Still other aspects include providing a cell comprising an alkali metal-containing anode and a cathode separated by an alkali metal ion conducting glass having an ionic transference number of unity and the general formula:

$A_{1+x}D_{2-x/3}Si_xP_{3-x}O_{12-2x/3}$, wherein A is an alkali metal of the anode, D is selected from the class consisting of Zr, Ti, Al, Sb, Be, Zn and Ge and X is in the range of from 2.25 to 3.0.

A final aspect is to provide a solid electrolyte for a battery having an anode containing alkali metal, the solid electrolyte including a glass having the general formula:

$A_{1+x}D_{2-x/3}Si_xP_{3-x}O_{12-2x/3}$, wherein A is an alkali metal, D is selected from the class consisting of Zr, Ti, Al, Sb, Be, Zn, Ge and mixtures thereof, and X is in the range of from 2.25 to 3.0.

Additional objects, advantages and novel features of the invention will be set forth in part in the descripion which follows, and in part will become apparent to those skilled in the art upon examination of the following or may be learned by practice of the invention. The objects and advantages of the invention may be realized and attained by means of the instrumentalities and combination particularly pointed out in the appended claims.

DESCRIPTION OF THE FIGURES

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DETAILED DESCRIPTION OF THE INVENTION

Figure 1:
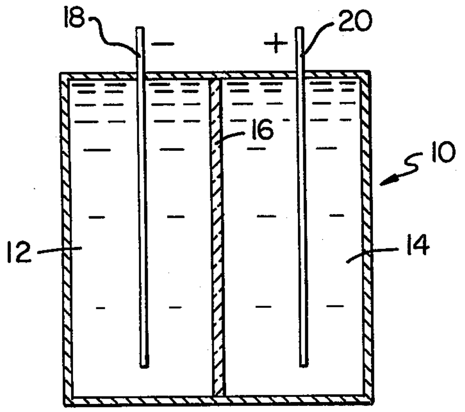
FIG. 1 is a schematic illustration of a cell utilizing the ionically conductive glass of the present invention.

The new glass composition of the present invention is an amorphous solid mixture having the general formula: $A_{1+x}D_{2-x/3}Si_xP_{3-x}O_{12-2x/3}$. As used herein the term "glass" unless otherwise specified is an amorphous mixture and specifically excludes the crystalline form.

With respect to the general formula stated above, A is an alkali metal and acts as a modifier to the glass. Where the glass is used in a battery, the modifier should be the same as the alkali metal present in the anode so that if sodium is present in the anode of the battery, then A should be sodium and if the anode of the battery contains lithium then A should be lithium. In general, it has been found that secondary cells and power cells principally employ either sodium or lithium; however, it is possible that potassium may also be used and its presence is contemplated in the scope of the invention.

D in the general formula represents a intermediate for the glass, the preferred intermediate being zirconium. Other intermediates which can be used includes the quadrivalent ions of group IV of the periodic table which are titanium and germanium and in addition aluminum, antimony, beryllium and zinc can be used as intermediates.

The silicon is present as the network former and phosphorous may or may not be present in the formula, although one would expect that the absence of phosphorous would result in a substantially lower ionic conductivity; however, a significant decrease in conductivity has not been found in glasses without phosphorous.

The present invention is useful in power cells of the type described in Brown et al. U.S. Pat. No. 3,476,602 issued Nov. 4, 1969 for Battery Cell wherein the anode consists of any of the alkali metals with sodium being preferred and the cathode consists of various sulfur compounds as well as the battery cell disclosed in the Levine et al. U.S. Pat. No. 3,663,294 issued May 16, 1972 for Battery Employing An Alkali Metal Polysulfide Having A Low Alkali Metal Hydroxide Content. The invention is also useful with secondary cells of the type disclosed in the Kaun et al. U.S. Pat. No. 4,011,373 issued Mar. 8, 1977 for Uncharged Positive Electrode Composition wherein the anode may be a lithium-aluminum alloy and the cathode may be a transition metal chalcogen such as iron sulfide. Wherever an ionic conductor is required wherein the ionic transference number is substantially unity and the other advantages of a glass are useful such as isotropic properties (uniform ionic conductivity and thermal expansion); absence of grain boundaries (no intergrannular corrosion); ease of preparation (high volume conduction at low cost); excellent mechanical properties (good strength-to-weight ratio in some sections); ease of fabrication (bipolar arrays are feasible); composition versatility (the glass may be tailored to the specific application); and absence of phase changes, whether the battery be a power cell useful for automobile use or whether it be a secondary cell having low current capacity of the type used in a remote signal station or in a space vehicle, the present invention would be desirable.

The ionically conductive glass of the present invention may be formed in any desired shape, for instance in an automobile power cell, wherein the battery is the load levelling type, the glass may be formulated in a tube closed at one end having a wall thickness in the range of between 1 to 2 millimeters and a diameter of about one centimeter. The length of the tube may be in the order of 30 centimeters. On the other hand, the glass of the present invention may be formed into hollow fibers of the type disclosed in the aforementioned Brown et al. U.S. Pat. No. 3,476,602 for use in a power cell for an automobile. In such a configuration the hollow fibers may have a diameter of between about 75 to 100 microns and the wall thickness of the hollow fibers may be in the order of 15 to 20 microns. Still another contemplated geometry for a battery electrolyte may be as bipolar arrays wherein the battery is like a stack of cards wherein thin sheets on the order of 1 millimeter or less in thickness are used to form a stack of series connected cells. It is clear, therefore, that the ionically conductive glass of the present invention is applicable to a wide variety of battery types and shapes.

Referring now to FIG. 1 there is disclosed a schematic illustration of a battery 10 having an anode 12 and a cathode 14 separated by a solid electrolyte 16 embodying the glass composition of the present invention. The anode 12 is provided with an anode lead 18 and the cathode 14 is provided with a cathode lead 20, both to be connected to an outside load as desired. The ionically conductive glass 16 of the present invention serves as both a separator and the solid electrolyte in the battery 10 which as before mentioned may be either a power cell or a secondary cell. Because the glass 16 has an ionic transference number or unity, the battery 10 will not be subject to internal discharge. Because the glass 16 of the present invention may be fabricated in a endless variety of shapes and sizes, its use is limited only by the imagination of the designer and the corrosiveness of the anode-acitve material and the cathode-active material.

The glass of the present invention is made in the usual manner by heating a mixture of particulate material to form a molten mass a temperature of about 1600° C. and then rapidly quenching at approximately 100° C. per second to a temperature of about 200° C. in a mold to form the various configurations useful in the battery art. For instance wafer-like discs 1 to 2 centimeters in diameter and between 1 to 2 millimeters thick have been formed with various formula variations wherein X=2.25, 2.5, 2.75 and 3.0. If the value of X is less than 2.25 then the resultant material is crystalline and does not fall within the invention. As before stated, beta alumina is a crystallographic structure which is subject to all the disadvantages of the crystalline material, that is fragility, brittleness, expensive fabrication requirements and the like. The value of X cannot exceed 3.0 because it is a meaningless composition, in that it is not on the quarternary phase diagram. It must be remembered that the glass of the present invention to perform as a solid electrolyte of the described type must be amorphous in character and must have an ionic transference number of unity.

Referring now to Table 1, there is listed the ionic conductivity and the activation energy for various values of X in the general formula wherein A is sodium and D is zirconium. The ionic conductivities are measured by the complex admittance method which measures the admittance of the solid electrolyte as a function of the frequency of an alternating current. The values reported in Table 1 were obtained at 300° C. and in all cases the ionic transference number is unity.

TABLE I

Ionic conductivity and activation energy for various compositions of the general formula: $Na_{1+x}Zr_{2-\frac{1}{3}x}Si_xP_{3-x}O_{12-\frac{2}{3}x}$

| x | 300° C. ($ohm^1cm^{-1}$) | $E_{act.}$ (eV) |
|---|---|---|
| 2.25 | $1.55 \times 10^{-3}$ | 0.60 |
| 2.50 | $1.08 \times 10^{-3}$ | 0.61 |
| 2.75 | $1.93 \times 10^{-3}$ | 0.55 |
| 3.00 | $1.23 \times 10^{-3}$ | 0.55 |
| 3.00 | $1.60 \times 10^{-3}$ | 0.55 |

Figure 2:
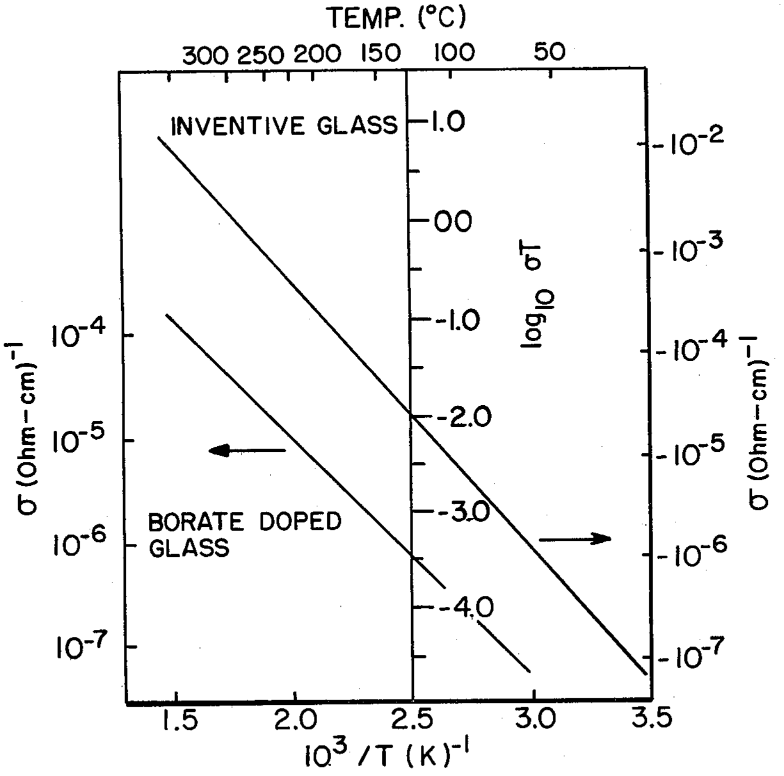
FIG. 2 is an Arrhenius plot for a typical composition for the present invetion compared to a borate doped glass.

FIG. 2 displays the Arrhenius plot for a typical compositon set forth in Table 1 compared to a borate doped glass useful in power batteries of the type described. In all cases, the glass of the subject invention had higher conductivity and the conductivities of the present invention differ from each other for all composition ranges by a factor less than 2. The activation energies for the different inventive compositons differ by 10 percent. As previously described, a critical aspect of the use of the inventive glasses for various cells is the corrosiveness of the electrode-active materials with respect to the solid electrolyte. Various compositions of the general formula wherein A is sodium and D is zirconium have been exposed for up to 100 hours in molten sodium and in molten sulfur maintained at a temperature of about 300° C. Observations by optical and scanning electron microscopy apparently indicate that for X=3 and X=2.5 the subject glass is resistant to molten sodium but shows surface crazing in pure molten sulfur. No reaction products have been observed or identified in the sulfur-exposed samples which leads one to believe that serious corrosive chemical reactions do not exist.

Summarizing, the invention pertains to a new glass composition useful as a solid electrolyte in various kinds of batteries such as power cells as well as secondary cells. Typically in the past, solid electrolytes for power cells have been beta alumina, a crystallograph structure of sodium, lithium, aluminum and oxygen. In 1976 the NASICON materials were introduced with a postulated stoichiometry of $Na_{1+x}Zr_2Si_xP_{3-x}O_{12}$; however, various investigators attempted but were unable to prepare these materials with a X value of 2. We discovered a revised stoichiometry corresponding to the general formula $A_{1+x}D_{2-x/3}Si_xP_{3-x}O_{12-2x/3}$ wherein A is selected from the class of alkali metals or mixtures or alloys thereof and D is selected from the class consisting of Zr, Ti, Ge, Al, Sb, Be, and Zn. It was found that this stoichiometry could be rearranged such that when X is in the range of from 2.25–3.0 a glass, that is an amorphous substance, is formed, which glass is a alkali metal super ionic conductor. Because the solid electrolyte is a glass rather than a crystalline material, certain significant advantages flow, such as isotropic properties, absence of grain bounderies, ease of preparation, excellent mechanical properties, ease of fabrication, compositon versatility and absence of phase changes. Accordingly, this solid electrolyte provides a significant increase and significant advance in the art.

Although the present invention has been described in terms of specific emobidments, it will be readily appreciated by those skilled in the art that various changes in materials, structure and process conditions can be made within the scope of the following claims:

The embodiments of the invention in which an exclusive property or privilege is claimed are defined as follows:

1. An ionically conductive glass having the general formula:

$A_{1+x}D_{2-x/3}Si_xP_{3-x}O_{12-2x/3}$, wherein A is an alkali metal, D is selected from the class consisting of Zr and mixtures of Zr and one or more of Ti, Ge, Al, Sb, Be, and Zn, and X is in the range of from 2.25 to 3.0.

2. The ionically conductive glass of claim 1, wherein said alkali metal is Li, Na, K or mixtures thereof.

3. The ionically conductive glass of claim 2, wherein D is selected from the class consisting of Zr and mixtures of Zr and one or more of Al, Ti, and Ge.

4. The ionically conductive glass of claim 1, wherein said alkali metal is Li or Na and D is Zr.

5. The ionically conductive glass of claim 1, wherein the alkali metal is Na and D is Zr.

6. The ionically conductive glass of claim 1, wherein the alkali metal is Li and D is Zr.

7. The ionically conductive glass of claim 1, wherein x=3, A is Na, D is Zr and the formula is: $(Na_2O)_2\text{-}ZrO_2(SiO_2)_3$.

8. The ionically conductive glass of claim 1, wherein the ionic transference number of said glass is unity.

9. A cell comprising an alkali metal-containing anode and a cathode separated by an alkali metal ion conducting glass having an ionic transference number of unity and the general formula: $A_{1+x}D_{2-x/3}Si_xP_{3-x}O_{12-2x/3}$, wherein A is an alkali metal of the anode, D is selected from the class consisting of Zr and mixtures of Zr and one or more of Ti, Ge, Al, Sb, Be, and Zn and X is in the range of from 2.25 to 3.0.

10. The cell of claim 9, wherein said cell is a power cell having an anode containing Li, Na or alloys thereof.

11. The cell of claim 10, wherein D is selected from the class consisting of Zr and mixtures of Zr and one or more of Ti, Ge and the cathode contains sulfur or compounds thereof.

12. The cell of claim 9, wherein said anode contains Na, A is Na and D is Zr.

13. The cell of claim 9, wherein said cell is a secondary cell with an anode containing Li, Na or alloys thereof.

14. The cell of claim 13, wherein D is selected from the class consisting of Zr and mixtures of Zr and one or more of Al, Ti and Ge and the cathode contains a transition metal chalcogen.

15. The cell of claim 13, wherein said anode contains Li, A is Li and D is Zr.

16. A solid electrolyte for a battery having an anode containing an alkali metal, said solid electrolyte including a glass having the general formula: Ahd $1+xD_{2-x/3}Si_xP_{3-x}O_{12-2x/3}$, wherein A is an alkali metal, D is selected from the class consisting of Zr and mixtures of Zr and one or more of Ti, Al, Sb, Be, Zn, Ge and mixtures thereof, and X is in the range of from 2.25 to 3.0.

17. The solid electrolyte of claim 16, wherein A is Li, Na, K or mixtures thereof and D is selected from the class consisting of Zr and mixtures of Zr and one or more of Al Ti, and Ge.

18. The solid electrolyte of claim 17, wherein A is Na and D is Zr.

19. The solid electrolyte of claim 16, wherein the ionic transference number of said solid electrolyte is 1.

* * * * *